(12) United States Patent
Feigel

(10) Patent No.: US 9,174,617 B2
(45) Date of Patent: Nov. 3, 2015

(54) BRAKING SYSTEM FOR MOTOR VEHICLES

(75) Inventor: Hans-Jorg Feigel, Frankfurt (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 222 days.

(21) Appl. No.: 13/695,179

(22) PCT Filed: Apr. 19, 2011

(86) PCT No.: PCT/EP2011/056209
§ 371 (c)(1),
(2), (4) Date: Oct. 29, 2012

(87) PCT Pub. No.: WO2011/134841
PCT Pub. Date: Nov. 3, 2011

(65) Prior Publication Data
US 2013/0043718 A1 Feb. 21, 2013

(30) Foreign Application Priority Data

Apr. 30, 2010 (DE) .......................... 10 2010 028 399
Apr. 14, 2011 (DE) .......................... 10 2011 007 353

(51) Int. Cl.
*B60T 8/34* (2006.01)
*B60T 8/40* (2006.01)
(Continued)

(52) U.S. Cl.
CPC ............... *B60T 8/4077* (2013.01); *B60T 7/042* (2013.01); *B60T 8/4845* (2013.01); *B60T 13/745* (2013.01)

(58) Field of Classification Search
CPC ..... B60T 7/042; B60T 13/745; B60T 8/4845; B60T 8/4077

USPC .......... 303/14, 113.4, 3, 15, 155; 60/545, 538
See application file for complete search history.

(56) References Cited

U.S. PATENT DOCUMENTS 4,489,989 A * 12/1984 Belart et al. ............. 303/122.13
4,624,108 A * 11/1986 Leiber ............................ 60/550
(Continued)

FOREIGN PATENT DOCUMENTS

DE   10 2006 030 1       1/2007
JP   2008-260351        10/2008
(Continued)

OTHER PUBLICATIONS

German Examination Report —Aug. 13, 2012.
(Continued)

*Primary Examiner* — Thomas J Williams
*Assistant Examiner* — Mariano Sy
(74) *Attorney, Agent, or Firm* — Brinks Gilson & Lione

(57) ABSTRACT

A braking system for motor vehicles. The system comprises a brake pedal, a travel simulator which is coupled via actuating-forces transmitting first mechanical connecting means to the brake pedal. A brake master cylinder having at least one pressure chamber and one piston. The pressure chamber is connected or connectable via a pressure line to at least one hydraulically actuable wheel brake, and an electrically controllable electromechanical drive device with which the piston of the brake master cylinder is actuable via a second mechanical connecting means. The electromechanical drive device is arranged between the brake pedal on one side and the brake master cylinder and the travel simulator on the other side. The first mechanical connecting means extends from the brake pedal through the drive device to the travel simulator.

15 Claims, 10 Drawing Sheets

(51) Int. Cl.
*B60T 7/04* (2006.01)
*B60T 8/48* (2006.01)
*B60T 13/74* (2006.01)

(56) References Cited

U.S. PATENT DOCUMENTS

| | | | | |
|---|---|---|---|---|
| 4,653,814 | A | * | 3/1987 | Burgdorf ........................ 303/52 |
| 5,531,509 | A | * | 7/1996 | Kellner et al. ............. 303/114.1 |
| 6,634,724 | B2 | * | 10/2003 | Kobayashi et al. ........... 303/155 |
| 7,367,187 | B2 | * | 5/2008 | Ikeda et al. ..................... 60/545 |
| 8,434,831 | B2 | * | 5/2013 | Yang .......................... 303/113.4 |
| 8,500,213 | B2 | * | 8/2013 | Ohtani et al. ..................... 303/3 |
| 2006/0186735 | A1 | * | 8/2006 | Ullrich et al. ............ 303/122.14 |
| 2008/0258545 | A1 | * | 10/2008 | Drumm ...................... 303/114.1 |
| 2008/0258546 | A1 | * | 10/2008 | Drumm et al. ............. 303/115.4 |
| 2010/0026083 | A1 | * | 2/2010 | Leiber et al. ...................... 303/3 |

FOREIGN PATENT DOCUMENTS

| WO | WO 2004/005095 A1 | 1/2004 |
|---|---|---|
| WO | WO 2006/111392 A1 | 10/2006 |
| WO | WO 2008/122468 A1 | 10/2008 |

OTHER PUBLICATIONS

PCT International Search Report —Jul. 20, 2011.

* cited by examiner

BRAKING SYSTEM FOR MOTOR VEHICLES

CROSS-REFERENCE TO RELATED APPLICATIONS

This application claims priority to Germany Patent Application Nos. 10 2010 028 399.1, filed Apr. 30, 2010, 10 2011 007 353.1, filed Apr. 14, 2011, and PCT/EP2011/056209, filed Apr. 19, 2011.

FIELD OF THE INVENTION

The invention relates to a braking system for motor vehicles.

BACKGROUND OF THE INVENTION

In automotive technology "brake-by-wire" braking systems are increasingly widely used. In these braking systems the brake can, on the one hand, be operated "extraneously", without active involvement of the vehicle driver, on the basis of electronic signals. These electronic signals may be output, for example, by an electronic stability program (ESC) or a distance control system (ACC). On the other hand, actuation of the braking system can be entirely or partially dispensed with if a braking effect requested by the driver by means of a brake pedal actuating force is implemented, for example, by switching an electric vehicle drive to generator mode. In both cases the actuation state of the brake does not correspond to the braking effect requested by the vehicle driver.

A braking system which comprises a brake pedal operatively connected to a travel simulator spring, and an electromotive drive device, is known from WO 2006/111392 A1. In that braking system the drive device includes an electric motor and a transmission and displaces a piston of a piston/cylinder system in such a way that a pressure is established in the working chamber of the cylinder, which is connected via a pressure line to a wheel brake. In this case the electric motor and the transmission of the drive device are arranged parallel to the piston of the piston/cylinder system; that is, the drive device is arranged around the piston/cylinder system. This results in a short overall length of the piston/motor unit; however, the corresponding, complex configuration of the transmission, for example the specially configured toothed rack of the transmission, is considered to be disadvantageous.

It is the object of the present invention to provide an alternative braking system of simpler construction.

This object is achieved according to the invention by a braking system as described herein.

SUMMARY OF THE INVENTION

The present invention is based on the concept that the electromechanical drive device is arranged between the brake pedal and the brake master cylinder and between the brake pedal and the travel simulator, and that the first mechanical connecting means extends from the brake pedal through the drive device to the travel simulator.

An advantage of the braking system according to the invention is its simple design combined with compact construction. Thus, a non-complex configuration of the second mechanical connection between drive device and brake master cylinder is made possible by arranging the drive device and the brake master cylinder one behind the other. A further advantage is that guidance of the first mechanical connecting means in the drive device can be implemented in a simple manner.

Preferably, the braking system can be activated in a brake-by-wire operating mode both by the vehicle driver and independently of the vehicle driver; the braking system is operated preferably in the brake-by-wire mode and can be operated in a fallback mode in which only operation by the vehicle driver is possible.

The braking system according to the invention includes a travel simulator coupled to the brake pedal by means of a first mechanical connecting means which transmits actuating forces. The travel simulator communicates an agreeable brake pedal feel to the vehicle driver in a brake-by-wire operating mode and advantageously includes at least one elastic element. Especially preferably, the effect of the travel simulator can be switched off, especially in a fallback mode.

Preferably, one of the mechanical connecting means is configured at least partially as a hollow body and the other mechanical connecting means extends at least partially through this hollow body. A mechanical guidance of the other connecting means is thereby achieved. In addition, the relative movement of the two connecting means can be measured and monitored simply in this way. Especially preferably, the second mechanical connecting means is configured to be at least partially hollow and the first mechanical connecting means is disposed at least partially inside the second mechanical connecting means.

The travel simulator preferably includes at least one piston/cylinder arrangement, the simulator piston of which is connected to the first mechanical connecting means. The simulator piston is advantageously guided displaceably in the cylinder of the piston/cylinder arrangement and cooperates with an elastic element which communicates an agreeable brake pedal feel to the driver. Especially preferably, the travel simulator includes at least one hydraulic piston/cylinder arrangement having a hydraulic chamber.

According to an especially advantageous development of the invention, the hydraulic chamber of the travel simulator is connected or is connectable to at least one wheel brake, for example by means of the brake master cylinder and/or a valve. In this way the travel simulator can serve as a charging device for pre-charging the wheel brakes.

The travel simulator advantageously includes at least one hydraulic piston/cylinder arrangement having a hydraulic chamber, the hydraulic chamber being connected via an electrically controllable, for example open when currentless (normally open) valve to a pressure medium container. The travel simulator can be switched off and on by closing and opening the valve.

The travel simulator preferably includes a further piston and a spring in addition to the simulator piston, the simulator piston having a smaller effective piston area than the further piston, being guided displaceably in the further piston and bearing against the further piston by means of the spring. A "springer" function (i.e. the system springs back to a predefined brake pressure value when the brake pedal is actuated) is thereby achieved.

In order to prevent reactions on the brake pedal in the event of antilock control an electrically controllable, open when currentless (normally open) isolating valve is preferably arranged between the hydraulic chamber of the travel simulator and the wheel brake.

According to another advantageous development of the invention, the hydraulic chamber of the travel simulator is connected via a nonreturn valve to the brake master cylinder and therefore to a wheel brake.

According to a development of the braking system according to the invention, the travel simulator and the brake master cylinder are arranged substantially parallel and side-by-side, and at least the first or the second mechanical connecting means includes a force deflecting means. A short overall length is thereby achieved.

According to a preferred embodiment of the braking system, the piston/cylinder arrangement of the travel simulator is arranged coaxially with the first mechanical connecting means and especially preferably coaxially with the drive device, and the second mechanical connecting means includes a force deflecting means.

According to another preferred embodiment, the brake master cylinder is arranged coaxially with the second mechanical connecting means and especially preferably coaxially with the drive device, and the first mechanical connecting means includes a force deflecting means.

The travel simulator preferably includes two piston/cylinder arrangements the simulator pistons of which are actuable jointly by the first mechanical connecting means. Advantageously, the two piston/cylinder arrangements are arranged symmetrically and in each case parallel to the brake master cylinder.

The electromechanical drive device preferably includes an electric motor and a transmission device, the transmission device being operatively connected to the second mechanical connecting means. Especially preferably, the transmission device is in the form of a ball screw drive.

According to a development of the braking system according to the invention, the first and second mechanical connecting means are configured in such a way that actuation of the brake master cylinder in the brake actuation direction by means of the first mechanical connecting means is possible through mechanical contact between the first mechanical connecting means and the brake master cylinder, or through mechanical contact between the first mechanical connecting means and the second mechanical connecting means. A brake actuation by the vehicle driver is thereby possible in the fallback mode, for example if the energy supply of the drive device has failed. In the brake-by-wire operating mode the mechanical contact between first mechanical connecting means and brake master cylinder or second mechanical connecting means should advantageously be prevented in order to prevent a reaction on the brake pedal. In the unactuated state of the braking system, therefore, a predefined mechanical gap advantageously exists between first mechanical connecting means and brake master cylinder or second mechanical connecting means. The first mechanical connecting means comes into mechanical connection with the brake master cylinder or with the second mechanical connecting means only after this predefined distance (gap) has been closed.

The braking system according to the invention preferably includes at least one sensor device by means of which the relative position of the first to the second mechanical connecting means is determined. An unintended mechanical contact between first mechanical connecting means and brake master cylinder or second mechanical connecting means can thereby be detected and, if appropriate, measures for preventing the contact can be initiated.

In order to prevent mechanical contact between the first mechanical connecting means and the brake master cylinder or between the first mechanical connecting means and the second mechanical connecting means, for example in the event of brake pressure reduction during an antilock control operation, the pressure chamber of the brake master cylinder is advantageously connectable via an electrically controllable valve to a pressure medium container, so that discharging of brake fluid from the brake master cylinder into the pressure medium container is possible in predefined situations.

The piston of the brake master cylinder is preferably actuable by means of the first mechanical connecting means even when the drive device is blocked. For this purpose the second mechanical connecting means especially preferably has a two-part configuration. Alternatively, it is especially preferred that the coupling between the piston of the brake master cylinder and the second mechanical connecting means is releasable.

The first mechanical connecting means and the second mechanical connecting means are advantageously configured and arranged in such a way that the second mechanical connecting means can be displaced by the drive device relative to the first mechanical connecting means over a predetermined distance in the brake actuation direction, without causing engagement of or reaction on the brake pedal. For this purpose an opening is provided, for example in the mechanical connecting means configured as a hollow body.

In order to modulate the brake pressure, preferably electrically controllable, open when currentless (normally open) valves are arranged in the brake lines to the wheel brakes. Brake pressure modulation is carried out with the aid of the drive device in multiplex operation.

For accelerated brake pressure reduction in a wheel brake, a wheel brake or a wheel brake circuit is especially preferably connectable to a pressure medium container via an electrically controllable, closed when currentless (normally closed) valve.

BRIEF DESCRIPTION OF THE DRAWINGS

Further preferred embodiments of the invention are apparent from the dependent claims and from the following description with reference to schematic figures, in which:

Mutually corresponding components are denoted by the same reference symbols in all figures.

DETAILED DESCRIPTION OF THE INVENTION

Figure 1:
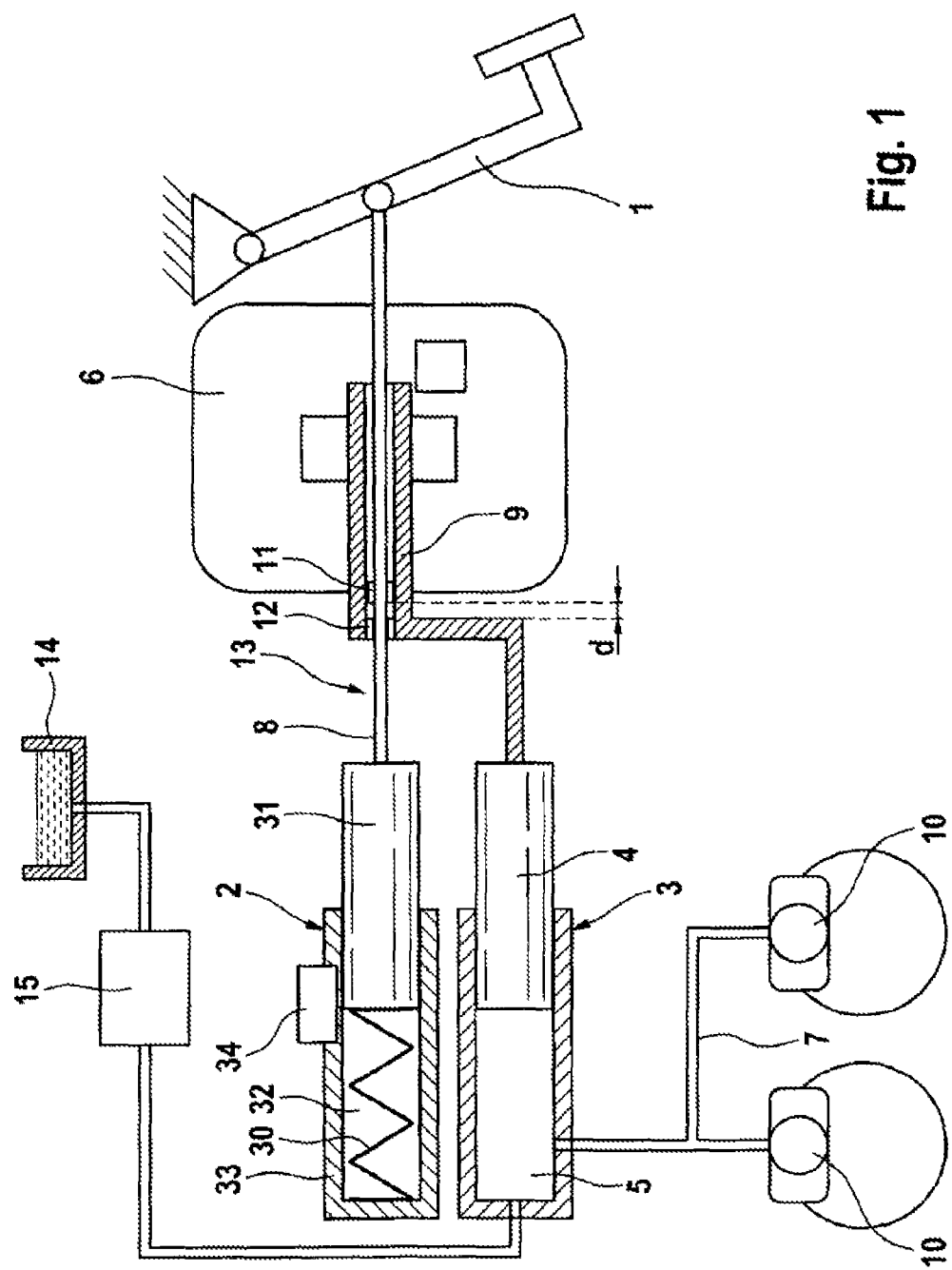
FIG. 1 shows a first exemplary embodiment of a braking system according to the invention.

In FIG. 1 a first exemplary embodiment of a braking system according to the invention is represented schematically. The braking system includes a brake pedal 1 which is coupled to a pedal feel simulator (travel simulator) 2 via a first mechanical connecting means 8 which transmits actuating forces. In the example, the first mechanical connection 8 is in the form of a push rod which connects the brake pedal 1 to the travel simulator 2. The pedal feel simulator 2 includes at least one elastic element, in the example a spring 30, and is designed to provide an agreeable brake pedal feel to the driver. The braking system further includes a brake master cylinder 3 in which at least one pressure piston 4 is guided displaceably, the piston 4 delimiting with the brake master cylinder 3 a pressure chamber 5 for generating a hydraulic brake pressure. The pressure chamber 5 of the brake master cylinder 3 is connected to hydraulically actuable wheel brakes 10 by means of brake line 7. The braking system further includes an electrically controllable drive device 6 for generating an external force for actuating the wheel brakes 10. For this purpose the pressure piston 4 is actuable by the electromechanical external force actuator 6 via a second mechanical connecting means 9. The actuator 6 can exert on the pressure piston 4 via the second mechanical connection 9 a force for actuating the brake master cylinder 3. The actuator 6 can be activated in accordance with a brake pedal actuation.

The drive device 6 is arranged between the brake pedal 1 and the brake master cylinder 3 and between the brake pedal 1 and the travel simulator 2. Accordingly, brake pedal 1 on one side and travel simulator 2 and brake master cylinder 3 on the other side are arranged on opposite sides of the actuator 6. The first mechanical connection 8 accordingly passes through the actuator 6.

In the example, the travel simulator 2 includes a piston/cylinder arrangement the simulator piston 31 of which is guided displaceably in the cylinder 33. Simulator piston 31 and cylinder 33 delimit a chamber 32 in which a spring 30, via which the simulator piston 31 bears against the cylinder 33, is arranged. The simulator piston 31 is rigidly connected to the first mechanical connecting means 8.

Travel simulator 2 and brake master cylinder 3 are arranged at a distance from one another, substantially axially parallel and side-by-side. In the present example the pedal feel simulator 2 is arranged coaxially with the first mechanical connection 8 which is configured to be straight (for example as a push rod) (axial alignment of first mechanical connecting means 8 and travel simulator 2). The second mechanical connecting means 9 includes a force deflecting means in order to be able to transmit the force exerted by the drive device 6 to the brake master cylinder 3, which is offset radially with respect to the travel simulator 2.

Figure 2:
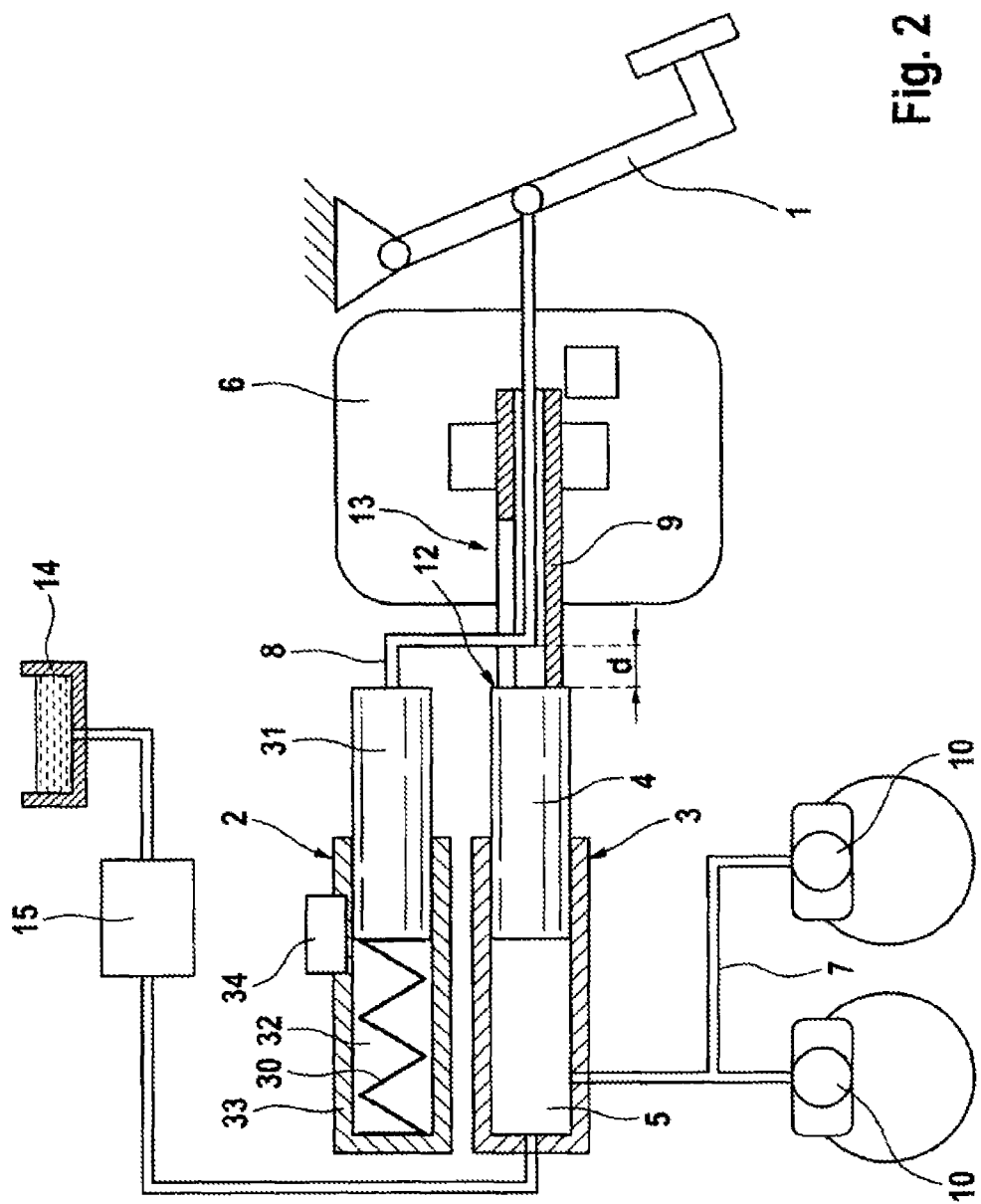
FIG. 2 shows a second exemplary embodiment of a braking system according to the invention.

The second mechanical connecting means 9 is implemented as a hollow body, for example as a cylindrical sleeve, in a region in and near the actuator 6, and the first mechanical connecting means 8 is arranged partially inside the hollow body. The second mechanical connection 9 has, for example in the region of the force deflecting means, an opening region in the direction of the travel simulator 2, in which the first mechanical connection 8 emerges from the interior of the hollow body. In FIG. 2 a second exemplary embodiment of a braking system according to the invention is represented schematically. Like the first exemplary embodiment, the braking system includes a brake pedal 1 which is coupled via a first mechanical connection 8 to a travel simulator 2, a brake master cylinder 3 with piston 4 and pressure chamber 5 to which the wheel brakes 10 are connected, and an electrically controllable drive device (actuator) 6 which is couplable or coupled via a second mechanical connection 9 to the pressure piston 4. Brake pedal 1 on one side and travel simulator 2 and brake master cylinder 3 on the other side are arranged on opposite sides of the actuator 6, travel simulator 2 and brake master cylinder 3 being arranged side-by-side. The first mechanical connection 8 extends through the actuator 6.

According to the second exemplary embodiment, the second mechanical connecting means 9 is configured substantially as a cylindrical hollow body and the brake master cylinder 3 is arranged coaxially with the second mechanical connecting means 9 (axial alignment of second mechanical connecting means 9 and brake master cylinder 3). The first mechanical connection 8 includes a force deflecting means in order to be able to transmit the brake pedal actuation to the travel simulator 2, which is offset radially with respect to the brake master cylinder 3.

The first mechanical connection 8 is disposed at least partially inside the hollow body of the second connecting means 9. The connecting means 9 has an opening region perpendicular to the direction of the brake master cylinder axis/second mechanical connection, in which opening region the first mechanical connection 8 emerges from the interior of the hollow body.

In both the first and the second exemplary embodiments, the first 8 and the second 9 mechanical connections are configured in such a way that, upon a displacement of the first mechanical connection 8 relative to the second mechanical connection 9 (in the direction of a brake actuation), which displacement reaches a predefined amount (distance d is covered), the first mechanical connection 8 comes into mechanical engagement with the second mechanical connection 9 or with the piston 4, so that the force exerted by a brake actuation on the first mechanical connection 8 is transmitted to the brake master cylinder 3. It is thereby possible, for example if an actuation of the brake master cylinder 3 via the external force actuator 6 is not possible because of failure of the energy supply of the external force actuator 6, for a brake pedal actuation to pass through to engage the brake master cylinder 3 in one operating mode of the braking system (a so-called mechanical fallback or failsafe operating mode).

For this purpose, in the example according to the first exemplary embodiment (FIG. 1), a projecting portion 11 which can come into engagement with a stop 12 arranged on the second mechanical connecting means 9 is arranged on the first mechanical connecting means 8, so that the actuating force is transmitted from the first mechanical connection 8 to the second mechanical connection 9 and therefore to the brake master cylinder 3.

According to the second exemplary embodiment represented in FIG. 2, the first mechanical connection 8 can come into contact with the pressure piston 4 in the region of the force deflecting means (upon reaching the end of the opening in the second mechanical connection 9); that is, the piston 4 forms a stop 12 for the connection 8. Accordingly, in the mechanical fallback operating mode the actuating force can be transmitted from the first mechanical connection 8 directly to the brake master cylinder 3.

According to the first and second exemplary embodiments, the second mechanical connection 9 is connected rigidly to the actuator 6 in the region thereof; that is to say that in the event of blocking of the actuator 6 the second mechanical connection 9 is prevented from moving by the actuator 6.

In order that the force acting on the brake pedal 1 in the fallback mode can be transmitted via the first mechanical connection 8 to the brake master cylinder 3 in the event of a blocked actuator 6, according to the first exemplary embodiment (FIG. 1) the second mechanical connection 9 is formed in two parts. The first part of the second mechanical connection 9, which is connected rigidly to the actuator 6, is prevented from moving by the actuator 6, whereas the second part of the second mechanical connection 9, which is connected rigidly to the piston 4, can be moved in the direction of the brake master cylinder 3 by means of the projecting portion 11 of the first mechanical connection 8. In this example, the first mechanical connection 9 is divided into two in the region of the stop 12. The stop 12 is arranged on the second part of the second mechanical connection 9.

In order to make possible transmission of the brake pedal force via the first mechanical connection 8 to the brake master cylinder 3 in the fallback operating mode with the actuator 6 blocked, according to the second exemplary embodiment represented in FIG. 2 the second mechanical connection 9 is formed in one piece and is connected rigidly to the actuator 6, but is not connected rigidly to the piston 4.

Accordingly, the piston 4 can be actuated by the first mechanical connection 8 in the brake actuation direction, the piston 4 moving away from the connection 9.

According to the exemplary embodiments (e.g. FIGS. 1 and 2), the pressure chamber 5 of the brake master cylinder 3 is connectable to a pressure medium container 14 via an electrically controllable, for example closed when currentless (normally closed), outlet valve 15. The pressure medium container (reservoir) 14 has a low pressure level and is configured, for example, as a low pressure accumulator or a pressure medium reservoir (atmospheric pressure). The operation of the outlet valve 15 is explained further below.

The functioning of the braking system according to the invention is explained in more detail below with reference to the exemplary embodiments shown in FIGS. 1 and 2. In a braking operation in the brake-by-wire operating mode, actuation of the brake pedal 1 causes a movement of the first mechanical connection 8 and a displacement of the simulator piston 31 of the travel simulator 2. The brake pedal actuation is detected by a sensor (not shown). The electromechanical actuator 6 is activated according to the brake pedal actuation detected and thus actuates the pressure piston 4 via the second mechanical connection 9 in accordance with the brake pedal actuation, leading to a brake pressure build-up in the wheel brakes 10. If the driver releases the brake pedal 1, the first mechanical connection 8 and the piston 31 of the pedal feel simulator 2 move against the brake actuation direction. The actuator 6 is activated correspondingly, so that the pressure piston 4 can yield (against the brake actuation direction) and the brake pressure in the wheel brakes 10 is reduced in accordance with the brake pedal actuation. In the case of a similar displacement of the first 8 and second 9 mechanical connections, contact with the stop 12 therefore does not take place.

Even if the brake pedal 1 is not actuated, the master cylinder 3 can be actuated by the actuator 6 via the second mechanical connection 9. This is necessary, for example, in the case of an active braking intervention by a stability control function or a distance control function. In order to prevent a reaction on the brake pedal 1 in this case, the first 8 and second 9 mechanical connections are configured, for example with respect to lengths and relative arrangement of force deflecting means, opening region, etc., in such a way that a displacement of the second mechanical connection 9 (in the brake actuation direction) relative to the first mechanical connection 8 over a predetermined distance 13 is possible without producing a force-transmitting connection (an abutment) and therefore a reaction on the brake pedal 1.

According to the first exemplary embodiment represented in FIG. 1, the second mechanical connection 9 can be moved in the brake actuation direction over the distance 13 before the second mechanical connection 9 comes into contact in the opening region with the simulator piston 31 of the travel simulator 2 and, upon further movement, causes engagement of the simulator piston 31 which leads to a reaction on the brake pedal 1.

According to the second exemplary embodiment represented in FIG. 2, the second mechanical connection 9 can be moved in the brake actuation direction over the distance 13 before the second mechanical connection 9 comes into contact, via the end of the opening region facing towards the brake pedal 1, with the first mechanical connection 8. Upon further movement of the second mechanical connection 9, engagement of the first mechanical connection 8 in the brake actuation direction is produced, leading to engagement of the brake pedal 1.

If the brake pressure in the wheel brakes 10 is to be reduced below the brake pressure level corresponding to the brake pedal actuation by the driver, for example in an antilock operation, the second mechanical connection 9 is moved against the brake actuation direction by the actuator 6. If the brake pedal actuation by the driver, and therefore the position of the first mechanical connection 8, remains unchanged, contact with the stop 12 can occur; that is, a force would be exerted on the first mechanical connection 8. Such a reaction would be perceptible by the driver on the brake pedal 1 and would be experienced as disturbing. To prevent this, an approach of the stop 12 to the first mechanical connection 8, 11 is detected and monitored by means of a sensor device 34, which detects the position of a component of the travel simulator 2 (for example the piston 31) or the position of the first mechanical connection 8, and by means of a sensor device 35 which detects the position of a component of the actuator 6 and therefore of the second mechanical connection 9, or the position of the piston 4 of the brake master cylinder 3. If the distance between stop 12 and first mechanical connection 8, 11 falls below a threshold value, the closed when currentless (normally closed) valve 15 is opened and the pressure chamber 5 of the brake master cylinder 3 is connected to the pressure medium container 14, whereby a reduction of the system pressure, and therefore of the pressure in the wheel brakes 10, if applicable, is achieved. Further moving back of the second mechanical connection 9 against the brake actuation direction by the actuator 6 is then no longer necessary.

The braking system according to the invention is advantageously used in motor vehicles which can be braked by means of generator operation of an electric drive motor (also referred to as regenerative braking or recuperative braking). In a regenerative braking operation the friction brakes 10 should in general not be actuated, or in some cases should be actuated only as assistance, in order to achieve a highest possible regenerative energy yield. Accordingly, in a regenerative braking operation a brake pedal actuation by the driver (that is, a displacement of the first mechanical connection 8, 11 in the brake actuation direction) must not cause a (significant) pressure build-up in the wheel brakes 10. In the braking systems in the examples, therefore, the closed when currentless (normally closed) valve 15 may be opened and the pressure chamber 5 of the brake master cylinder 3 may be connected to the pressure medium container 14 during a regenerative braking operation, so that pressure medium can be discharged into the pressure medium container 14 in the event of actuation of the brake master cylinder 3 by the first mechanical connecting means (via stop 12). Additionally, the actuator 6 may be activated in order to actuate the brake master cylinder 3 via the second mechanical connecting means 9. In this way, engagement of the first mechanical connecting means 8, 11 with the stop 12 is prevented yet brake pressure is not built up at the wheel brakes 10. A critical approach of the first mechanical connection 8, 11 to the stop 12 can be detected, as explained above, by means of the sensor devices 34, 35.

The travel simulator 2 is advantageously designed to be able to be switched off. For example, the travel simulator 2 and the switch-off thereof are designed in such a way that, in the event of failure of the braking system, for example if the power fails, none or only a little of the lost force remains effective.

Figure 3:
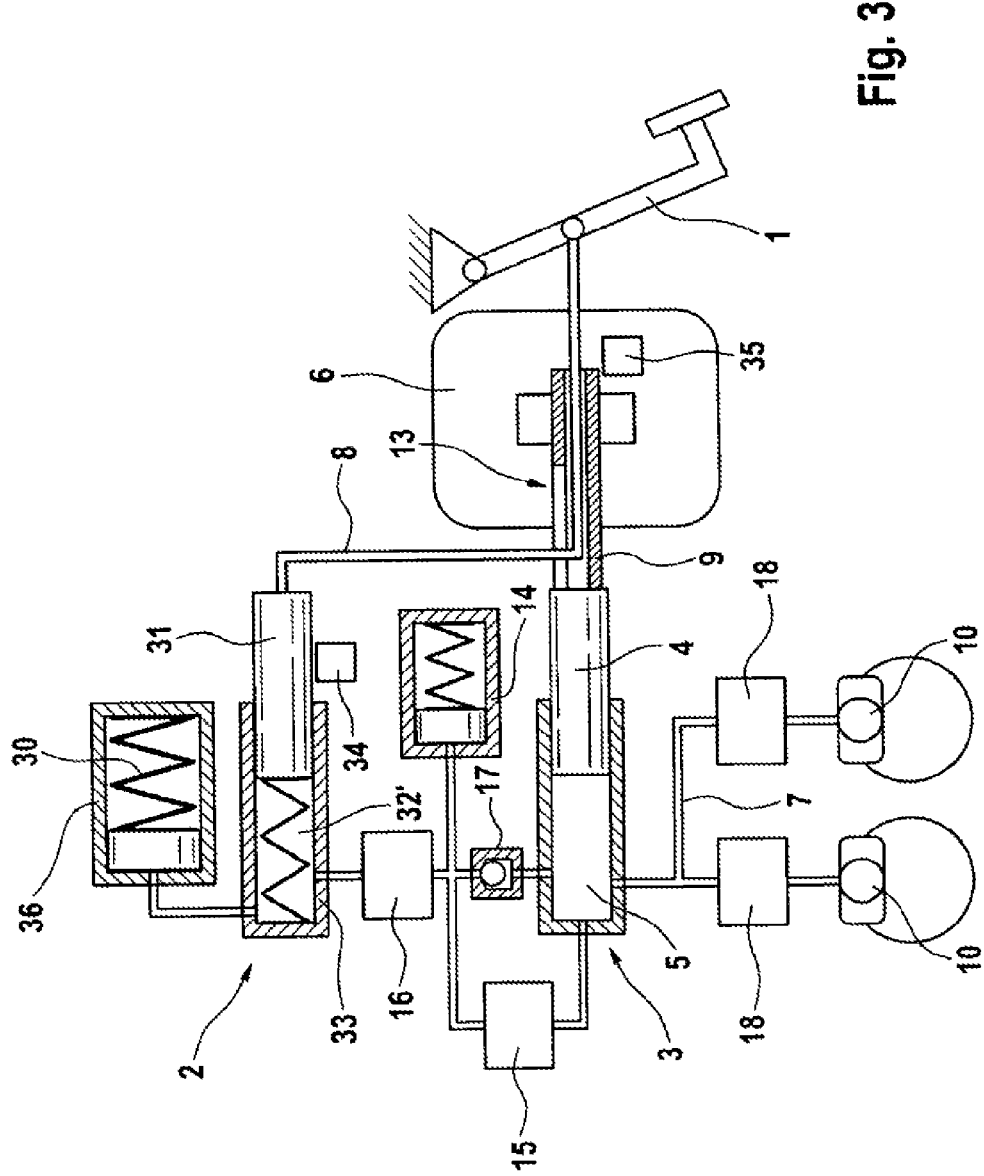
FIG. 3 shows a third exemplary embodiment of a braking system according to the invention.

In FIG. 3 a third exemplary embodiment of a braking system according to the invention is represented schematically. As in the second exemplary embodiment, the second mechanical connecting means 9 is configured substantially as a cylindrical hollow body and the brake master cylinder 3 is arranged coaxially with the second mechanical connecting means 9. The first mechanical connection 8 includes a force deflecting means in order to be able to transmit the brake pedal actuation to the travel simulator 2 which is offset radially with respect to the brake master cylinder 3; and said first mechanical connection 8 is disposed at least partially inside the hollow body of the second connecting means 9 and extends through the actuator 6. Unlike the second exemplary embodiment, the travel simulator 2 according to the third exemplary embodiment is hydraulic. The travel simulator 2 comprises a piston/cylinder arrangement the simulator piston 31 of which is guided displaceably in the cylinder 33 and which includes a hydraulic chamber 32'. The simulator piston 31 is actuable by the first mechanical connecting means 8 and is rigidly connected thereto. Optionally, the travel simulator 2 includes a further simulator arrangement 36 which is connected hydraulically to the hydraulic chamber 32' of the piston/cylinder arrangement 31, 33.

The hydraulic chamber 32' of the travel simulator 2 is connectable via an electrically controllable, for example open when currentless (normally open) valve 16 to a pressure medium container 14, in order to enable the simulator 2 to be switched off (for example in the fallback operating mode). In the example, the pressure medium container 14 is in the form of a low pressure accumulator, but it may also be in the form of a pressure medium reservoir. In order to reduce the hydraulic components of the braking system, the hydraulic chamber 32' of the travel simulator 2 and the pressure chamber 5 of the brake master cylinder 3 are advantageously connectable to the same pressure medium container 14, as is apparent from FIG. 3. However, two pressure medium containers may also be used.

In the normal operating mode of the braking system (brake-by-wire operating mode), the valve 16 is closed (is energized in the example) and the hydraulic chamber 32' of the simulator 2 is isolated from the pressure medium container 14.

The brake master cylinder 3 of the braking system is preferably designed in such a way that a vehicle deceleration of at least 0.5 g (g: acceleration due to gravity) can be achieved with a pedal actuating force of 500 N.

In order to achieve a deceleration of the vehicle which is perceptible to the driver with short pedal travel distances, for example in the above-described design of the braking system, the braking system advantageously includes a charging device with which pre-charging of the wheel brakes 10 can be carried out. The charging device comprises, for example, a cylinder/piston arrangement with a hydraulic chamber the piston of which is actuable by the first mechanical connection 8. The hydraulic chamber of the charging device is connected to the wheel brakes 10 or to the pressure chamber 5 of the brake master cylinder 3. By means of the charging device the wheel brakes 10 can be charged up to a predefined pressure. The predefined pressure can be set/predefined, for example, by a pressure limiting valve or by the pretension of a low pressure accumulator spring. Upon actuation of the brake pedal 1, the piston of the charging device is actuated by the first mechanical connection 8 so that the wheel brakes 10 are charged from the charging device until a pressure value predefined by the pressure limiting valve or by the pretension of the spring of the low pressure accumulator is reached.

According to the third exemplary embodiment of FIG. 3, the travel simulator 2 or its cylinder/piston arrangement 31, 32', 33 is used as the charging device. For this purpose the hydraulic chamber 32' of the travel simulator 2 is connected via a nonreturn valve 17 to the brake master cylinder 3 and therefore to the wheel brakes 10. The pretension of the spring of the low pressure accumulator 14 limits the charging pressure.

Figure 4:
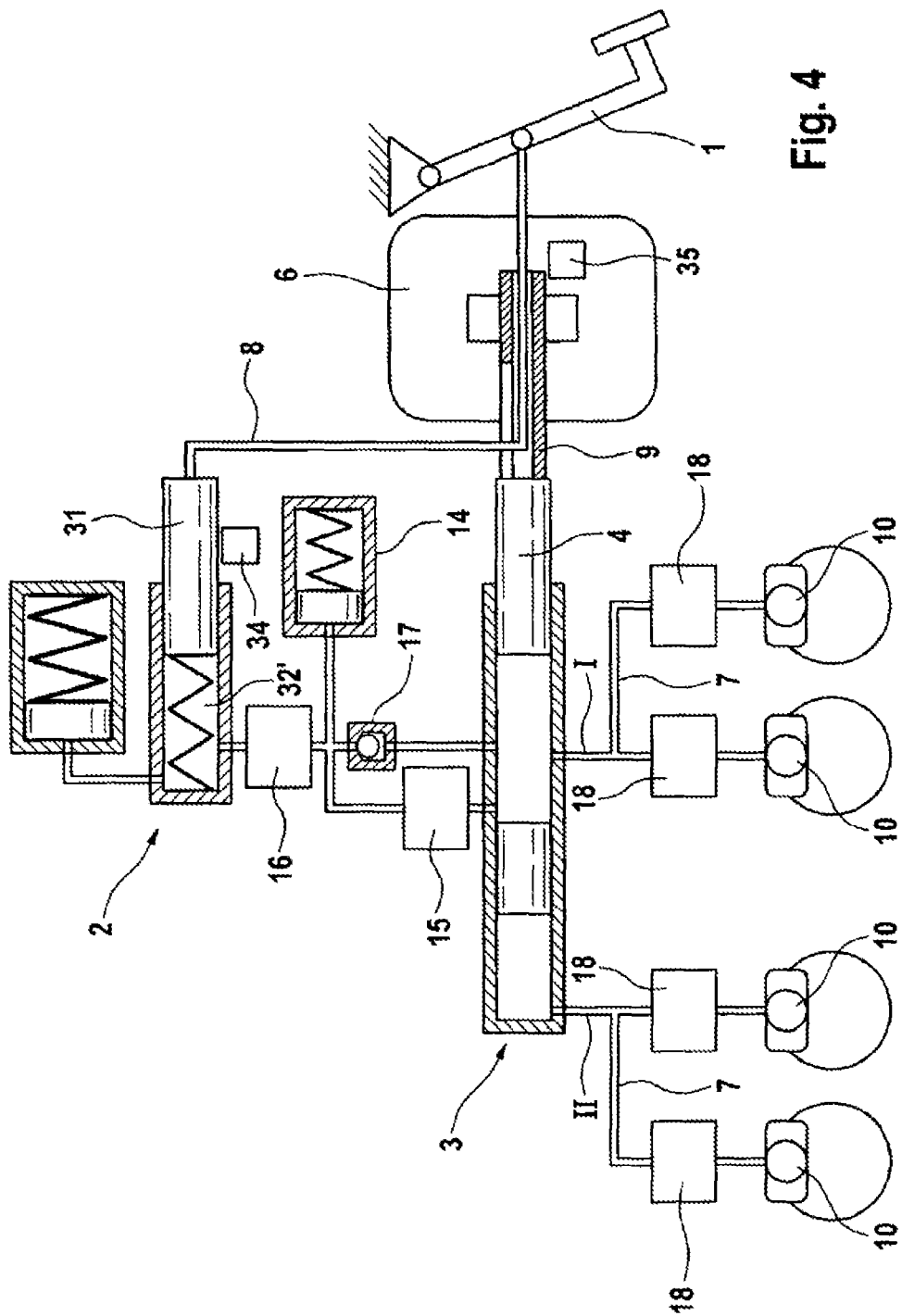
FIG. 4 shows a fourth exemplary embodiment of a braking system according to the invention.

In FIG. 4 a fourth exemplary embodiment of a braking system according to the invention, in which the brake master cylinder is in the form of a tandem master cylinder 3 (of axial configuration), is represented schematically. The primary piston 4 of the tandem master cylinder 3 is actuable by the electromechanical external force actuator 6 via the second mechanical connecting means 9. In the example, the primary piston circuit I and the floating piston circuit II are connected to two wheel brakes 10 in each case. In order to modulate the brake pressure, one electrically controllable, for example open when currentless (normally open) valve 18 for each wheel brake 10 is arranged in the brake lines 7 to the wheel brakes 10. Brake pressure modulation can be performed with the aid of the (reversing) actuator 6 in multiplex operation. The other components of the braking system and their arrangement correspond substantially to those of the third exemplary embodiment.

Figure 5:
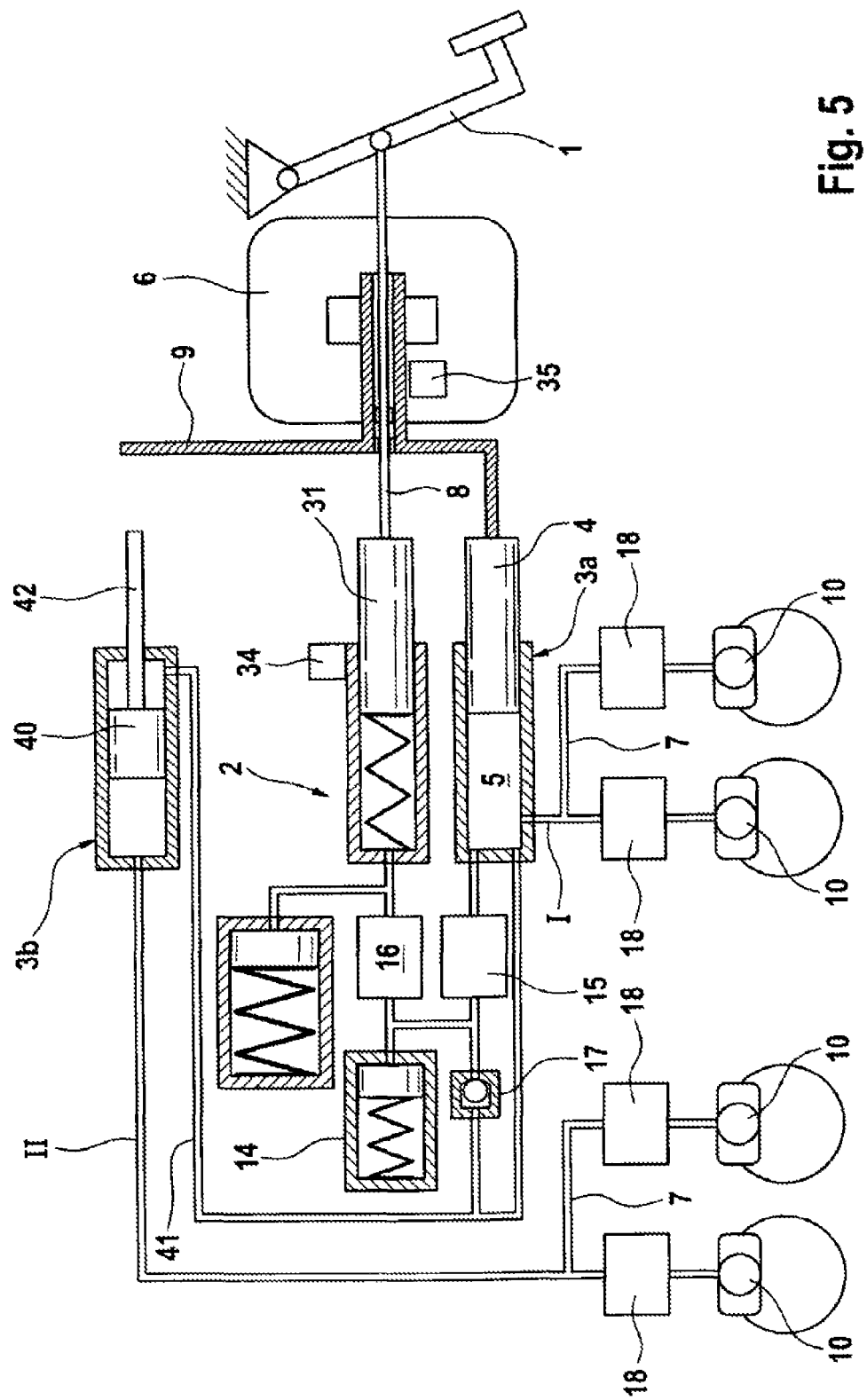
FIG. 5 shows a fifth exemplary embodiment of a braking system according to the invention.

In FIG. 5 a fifth exemplary embodiment of a braking system according to the invention having a tandem master cylinder 3a, 3b of divided configuration is represented schematically. The travel simulator 2 is arranged coaxially with the first mechanical connecting means 8. The tandem master cylinder 3 comprises two cylinder/piston arrangements, the cylinder/piston arrangement 3a of the primary piston circuit being configured parallel to the cylinder/piston arrangement 3b of the floating piston circuit. The pressure piston 4 of the cylinder/piston arrangement 3a is coupled mechanically to the drive device 6 (via the mechanical connecting means 9) and the piston 40 of the cylinder/piston arrangement 3b is coupled hydraulically to the piston 4 via a line 41. Both cylinder/piston arrangements 3a, 3b are arranged parallel to the travel simulator 2, the cylinder/piston arrangements 3a, 3b being arranged on opposite sides of the travel simulator 2. The second mechanical connection 9 is advantageously configured in such a way that the piston 40 of the floating piston circuit can also be actuated mechanically by means of the second mechanical connecting means 9 (for example in the event of failure of the primary piston circuit).

In the example, the piston 40 of the floating piston circuit is actuated only after a predefined displacement of the second mechanical connection 9 in the brake actuation direction. For this purpose a mechanical gap is present between the second mechanical connection 9 and the pressure piston 40 of the floating piston circuit, which gap must first be closed before the second mechanical connection 9 comes into engagement with a prolongation 42 connected to the pressure piston 40.

The other components of the braking system according to the fifth exemplary embodiment, as well as their arrangement and operation, have already been explained in connection with FIGS. 1 to 4.

Figure 6:
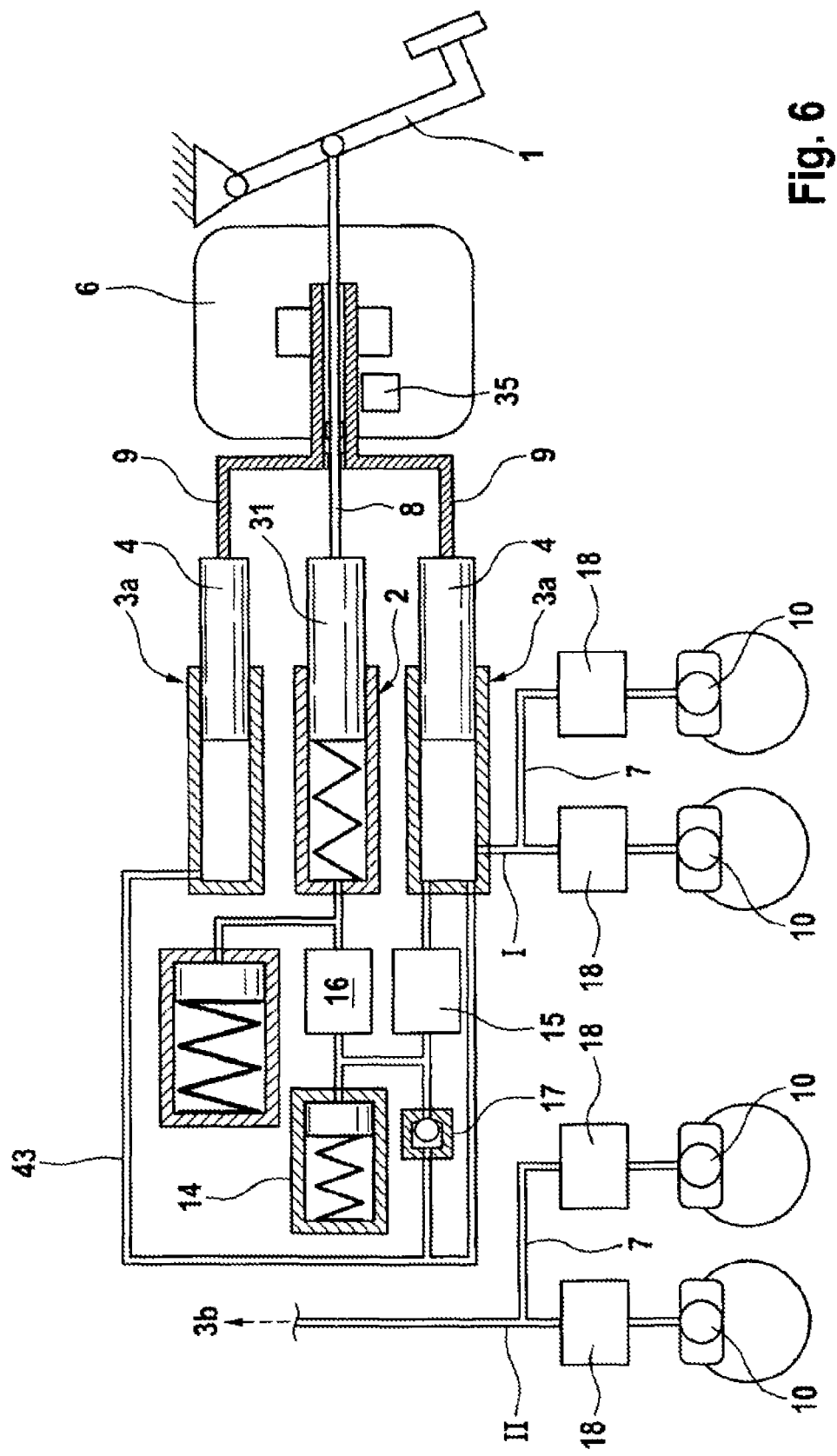
FIG. 6 shows a sixth exemplary embodiment of a braking system according to the invention.

FIG. 6 shows a sixth exemplary embodiment of a braking system according to the invention. Here, too, the brake master cylinder 3 is in the form of a tandem master cylinder of divided configuration. Unlike the fifth exemplary embodiment, the primary piston circuit and the floating piston circuit are formed by two respective cylinder/piston arrangements 3a, 3b, the piston area of a piston being in each case half as large as the piston area of the corresponding pressure piston for each circuit of the fifth exemplary embodiment. The pressure chambers of the two cylinder/piston arrangements of a circuit are connected to one another via a hydraulic line (e.g. line 43 for cylinder/piston arrangements 3*a*).

The two cylinder/piston arrangements 3*a*, 3*b* of a respective circuit I, II are in each case arranged parallel to the travel simulator 2, on opposite sides of the travel simulator 2 and symmetrically to the axis of the first mechanical connecting means 8. This division into two cylinder/piston arrangements (per circuit) and their symmetrical arrangement permits moment-free force transmission by the actuator 6. In the example, the two piston arrangements 3*b* of the floating piston circuit are rotated through 90° with respect to the two piston arrangements 3*a* of the primary piston circuit. For this reason, only the primary piston circuit (piston arrangements 3*a*) is shown in FIG. 6; the piston arrangements 3*b* are arranged rotated through 90° and are not shown for greater clarity.

Figure 7:
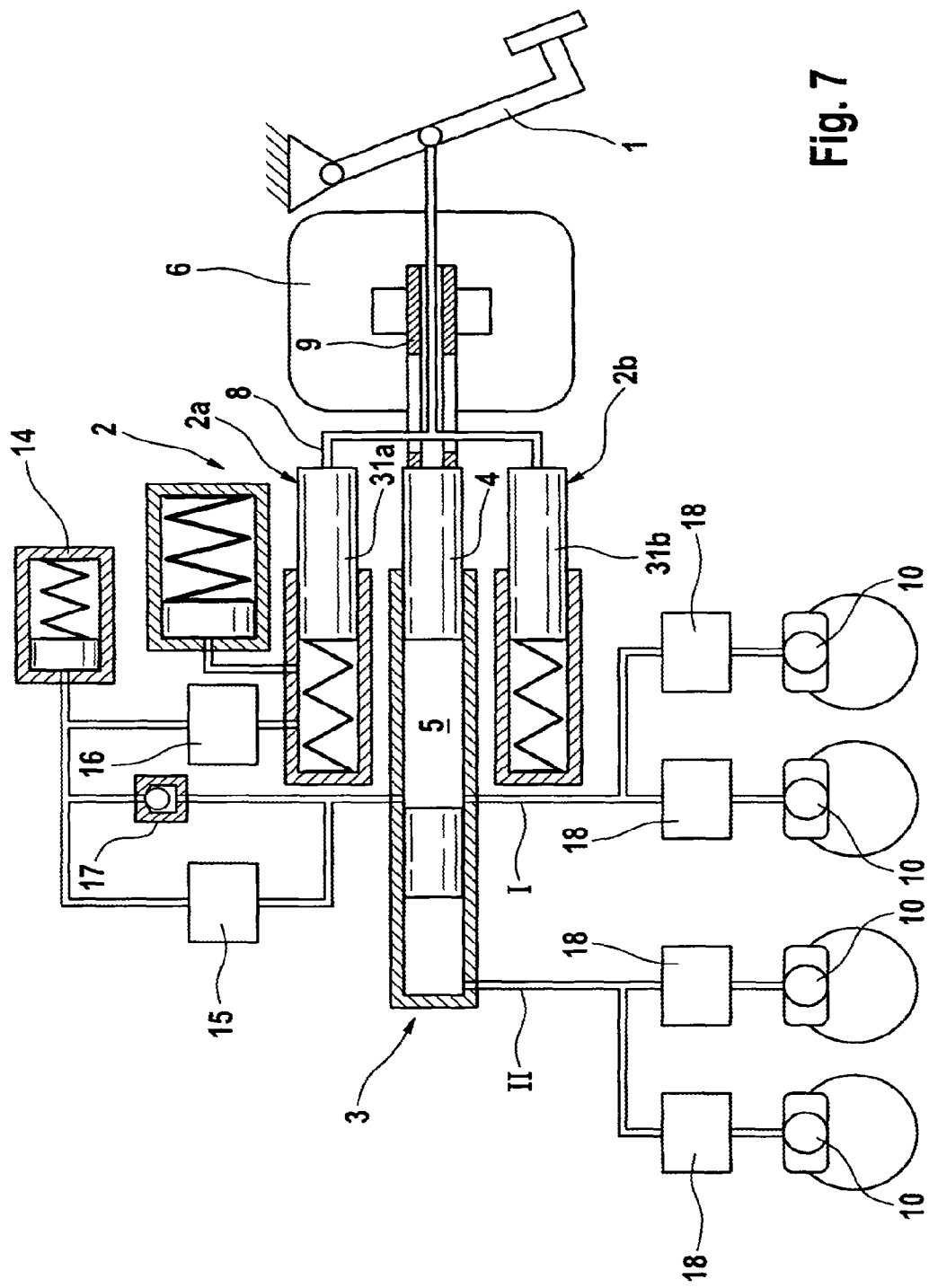
FIG. 7 shows a seventh exemplary embodiment of a braking system according to the invention.

In FIG. 7 a seventh exemplary embodiment of a braking system according to the invention having a tandem master cylinder 3 arranged coaxially with the second mechanical connection 9 is represented schematically. The travel simulator 2 comprises two piston/cylinder arrangements 2*a*, 2*b*, the simulator pistons 31*a*, 31*b* of which are actuable jointly by the first mechanical connecting means 8, which accordingly includes two force deflecting means. The two piston/cylinder arrangements 2*a*, 2*b* are arranged symmetrically on opposite sides of the brake master cylinder 3. Moment-free actuation by the brake pedal 1 via the first mechanical connection 8 is thereby possible. The braking system according to the seventh exemplary embodiment also includes, per wheel brake 10, a for example open when currentless valve 18 which serves, with the aid of the actuator 6, to provide brake pressure modulation in multiplex operation.

FIG. 8*a* show schematically a detail of an eighth exemplary embodiment of a braking system according to the invention. The pressure chamber 5 of the brake master cylinder 3 is connected via brake line 7 to hydraulically actuable wheel brakes 10. The pedal feel simulator 2 is implemented hydraulically and includes a cylinder/piston arrangement with a hydraulic chamber 32' which is connectable to the wheel brakes 10. In the example, an electrically controllable, for example open when currentless (normally open), isolating valve 19 is arranged between the wheel brakes 10 (or their inlet valves 18) and the hydraulic chamber 32'. By closing the isolating valve 19, pressure-change reactions of the wheel brakes 10 on the simulator 2/brake pedal 1 during brake pressure modulation, for example during an ABS or stability control operation (effected by movement of the actuator 6), can be prevented. If required, the brake pedal can be reset by means of the external force actuator 6 (via pressure build-up in the brake master cylinder 3) by opening the isolating valve 19 or with the isolating valve 19 open.

As is apparent from FIG. 8*a*), the pedal feel simulator 2 is additionally configured, in the example, in such a way that pressure reaction (e.g. from the wheel brakes 10) is reduced in a relatively low pressure range. For this purpose the pedal feel simulator 2 includes two different effective areas A1, A2 and optionally a spring 20. The hydraulic chamber 32' is delimited by a first piston 21 of effective area A1 and by a second piston 31, of smaller effective area A2, which passes through the first piston 21, the piston 31 being actuated by the first mechanical connecting means 8 and bearing against the piston 21 via the spring 20 in the brake actuation direction.

The operation of the pedal feel simulator 2 is explained below with reference to FIG. 8.

During an actuation of the brake pedal 1 (with pedal force F), the smaller piston area A1 of the second piston 31 is initially effective over short pedal travel distances s, producing a shallow force-travel characteristic curve, as shown in region A in FIG. 8*b*. When the spring 20 reaches the first piston 21 the spring 20 is initially compressed, producing a more steeply rising force-travel characteristic curve (region B in FIG. 8*b*) until the piston 21 with its effective surface A2 is displaced, producing a still steeper rise in the force-travel characteristic curve (region C in FIG. 8*b*).

The effective areas A1, A2 of the travel simulator 2 can be subjected to the pressure of the wheel brakes 10 and, through the construction of the simulator 2 (two piston areas A1, A2 of different size becoming active with an offset, slow transition as a result of the spring 20), the pressure reaction is reduced in a relatively low pressure range (so-called "Springer" function explained earlier).

Figure 9:
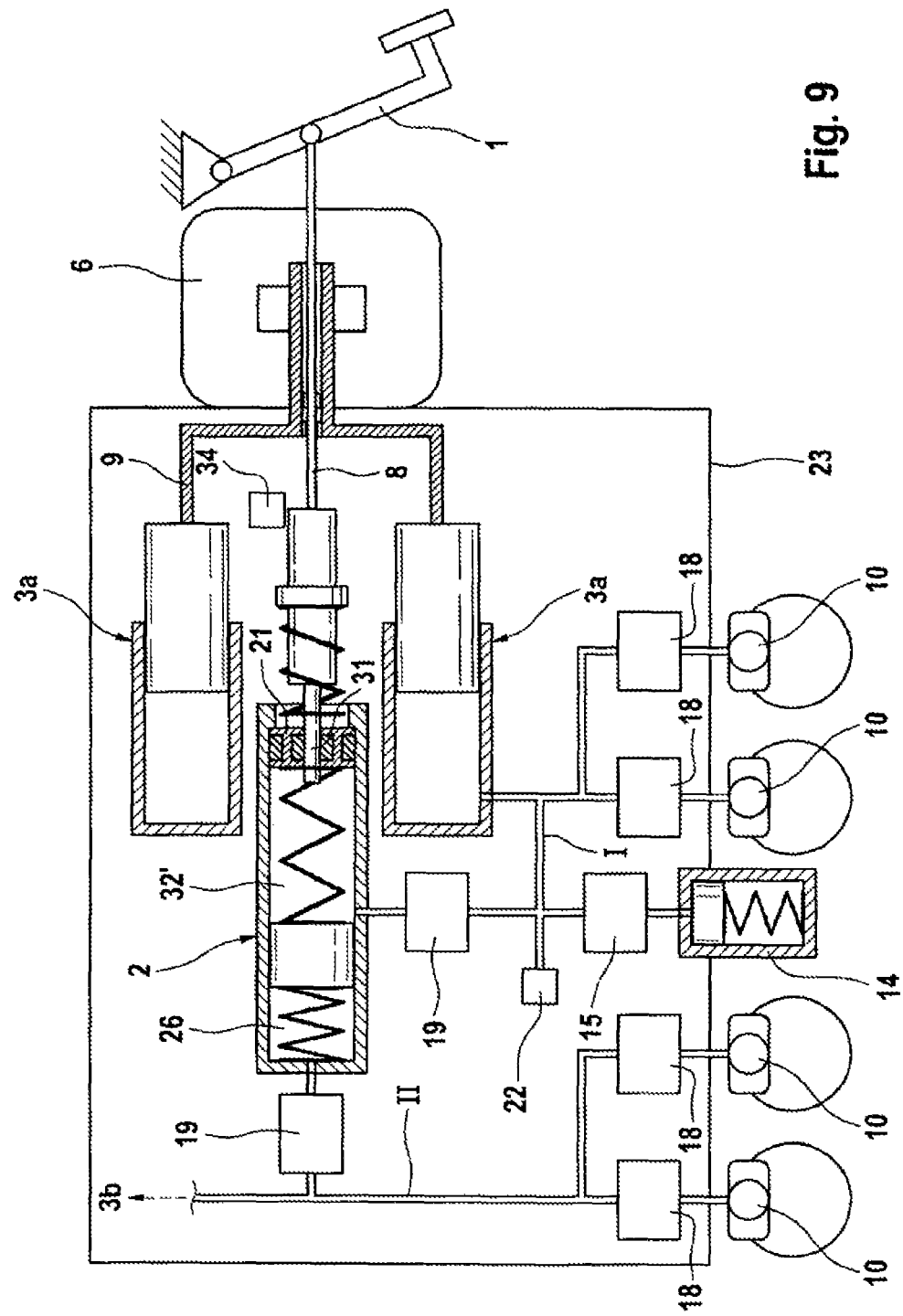
FIG. 9 shows a ninth exemplary embodiment of a braking system according to the invention.

In FIG. 9 a ninth exemplary embodiment of a braking system according to the invention is represented schematically. The travel simulator 2 has a two-stage configuration, the first stage being implemented in a manner corresponding to the eighth exemplary embodiment. The travel simulator 2 comprises a piston/cylinder arrangement having two hydraulic chambers 32' and 26 which are arranged one behind the other and are separated by a floating piston. The piston 31 is actuated by means of the first mechanical connecting means 8. Each of the hydraulic chambers 32', 26 of the travel simulator 2 is connected to a brake circuit I, II, each having two wheel brakes 10, and an open when currentless (normally open) valve 18 for brake pressure modulation being connected upstream of each wheel brake. In each brake circuit I, II an open when currentless isolating valve 19 for preventing pressure-change effects during brake modulation is arranged between hydraulic chamber 32', 26 and wheel brakes 10. The brake master cylinder 3 is in the form of a tandem master cylinder of divided configuration, the primary piston circuit and the floating piston circuit being formed in each case by two cylinder/piston arrangements 3*a*, 3*b* which are arranged symmetrically with respect to the axis of the first mechanical connection 8 (on opposite longitudinal sides of the travel simulator 2) for moment-free force application by the actuator 6. Brake circuit I with two wheel brakes 10 is connected to the primary piston circuit of the tandem master cylinder 3, and brake circuit II with two wheel brakes 10 is connected to the floating piston circuit. The two cylinder/piston arrangements 3*b* of the floating piston circuit are arranged rotated through 90° with respect to the two cylinder/piston arrangements 3*a* of the primary piston circuit, for which reason only the primary piston circuit is represented in FIG. 9.

According to the ninth exemplary embodiment, the travel simulator 2 is used as a charging device (volume booster principle). For this purpose the hydraulic chamber 32' of the travel simulator 2 is connected to brake circuit I and therefore to the corresponding wheel brakes 10. In addition, the hydraulic chamber 32' is connected via an electrically controllable, for example closed when currentless (normally closed), valve 15 to a low pressure accumulator 14. The pretension of the spring of the low pressure accumulator 14 limits the charging pressure.

In the example, the sensor device 34 which detects the state of the travel simulator 2 is in the form of a travel sensor 34 for sensing the position/displacement of the piston 31 of the travel simulator 2 or of a component connected thereto. The braking system further includes, in the example, a pressure sensor 22 for measuring the pressure of the primary piston circuit.

As is apparent from FIG. 9, the hydraulic components of the braking system, in particular travel simulator 2, brake master cylinder 3, valves 15, 18, 19, and optionally the sensor devices, for example sensor devices 34, 22, are advantageously arranged in a housing 23. The housing 23 can easily be arranged on the side of the drive device 6 oriented away from the brake pedal 1. In this way, only the two mechanical connecting means 8 and 9 run from the housing of the drive device 6 to the housing 23.

Figure 8:
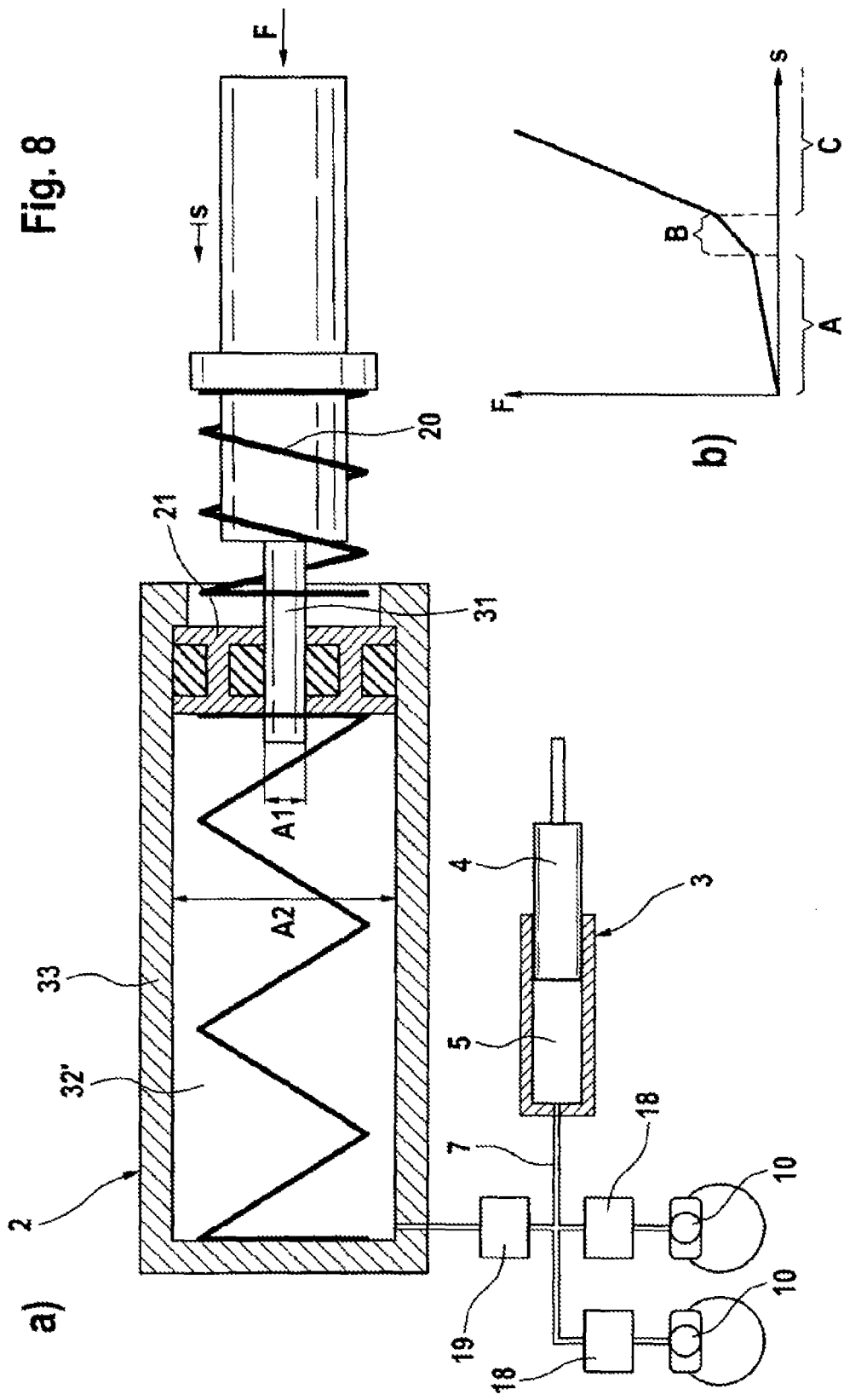
FIG. 8 shows a detail of an eighth exemplary embodiment of a braking system according to the invention.

As already described above, the travel simulator 2 is advantageously connected via one or more open when currentless (normally open) isolating valves 19 to the wheel brakes 10 (see FIGS. 8 and 9). During regenerative braking, the multiplex valves 18 are closed in order to prevent a pressure build-up in the wheel brakes 10. At low pressures, the volume displaced by the driver in the travel simulator 2 is discharged via valve 15 into a low pressure accumulator 14. At high pressures, the counterpressure in the travel simulator 2 is simulated by suitable activation of the actuator 6.

Figure 10:
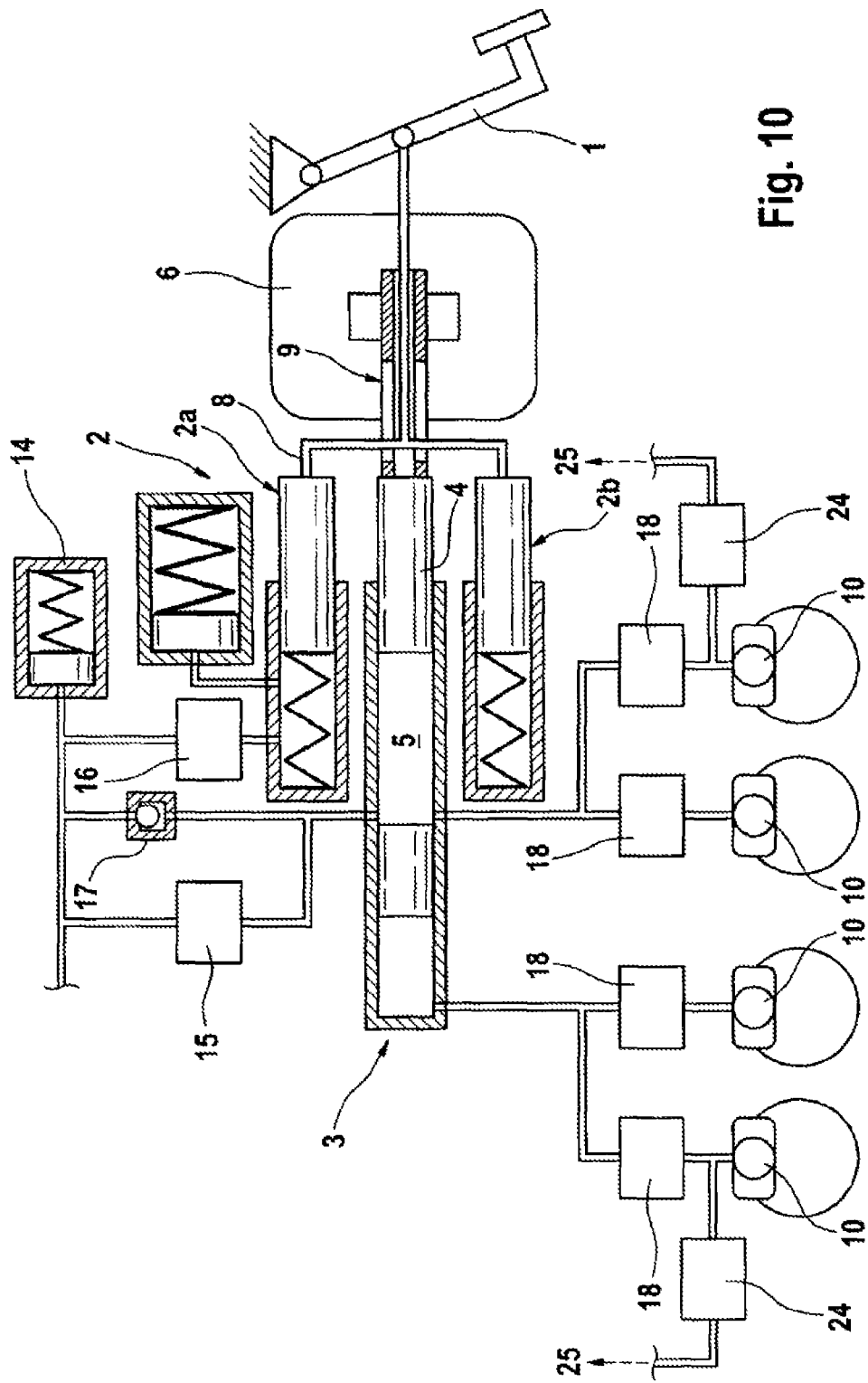
FIG. 10 shows a tenth exemplary embodiment of a braking system according to the invention.

In FIG. 10 a tenth exemplary embodiment of a braking system according to the invention is represented schematically. This exemplary embodiment corresponds largely to the seventh exemplary embodiment. In addition to the open when currentless (normally open) valves 18 in the brake lines to the wheel brakes 10, which are used to modulate brake pressure, the braking system additionally includes electrically controllable, for example closed when currentless (normally closed) valves 24 on one or more, for example all, wheel brakes circuits, by means of which valves 24 a connection to a low pressure level 25 (pressure medium reservoir (atmospheric pressure) or low pressure accumulator) can be established. In the example, two of the wheel brakes 10 are additionally connectable via valves 24 to a low pressure level 25, making possible a rapid brake pressure reduction in these wheel brakes. This makes available a possibility of improving the speed of the brake pressure modulation in the event of a simultaneous demand for a pressure reduction at one wheel brake and a pressure build-up at another wheel brake.

The electrically controllable electromechanical drive device 6 of the exemplary embodiments comprises, for example, an electric motor and a rotation/translation gear, for example a ball screw drive, for converting a rotary motion of the electric motor to a linear motion. The drive device 6 is advantageously arranged in a housing, the first mechanical connecting means 8 extending through the housing.

A braking system according to the invention advantageously includes a sensor device 34 for detecting the state of the travel simulator 2, for example for detecting the position of a component of the travel simulator (for example, a piston 31), or for detecting the position of the first mechanical connecting means 8, and a sensor device 35 for detecting the state of the brake master cylinder 3, for example for detecting the position of a piston 4 of the brake master cylinder 3 or the position of the second mechanical connecting means 9, or the position of a component of the actuator 6 (for example, the position of the rotor of the electric motor or the position of a spindle of a rotation/translation gear).

Additionally or alternatively, a braking system according to the invention advantageously includes a sensor device 22 for detecting a pressure in the brake master cylinder 3 and/or in a wheel brake 10, and/or a sensor device for detecting a pressure in the travel simulator 2.

While the above description constitutes the preferred embodiment of the present invention, it will be appreciated that the invention is susceptible to modification, variation and change without departing from the proper scope and fair meaning of the accompanying claims.

The invention claimed is:
1. A braking system for motor vehicles, comprising
a brake pedal,
a travel simulator which is coupled via a first mechanical connecting means to the brake pedal for transmitting actuating forces,
a brake master cylinder having a pressure chamber and a master cylinder piston, the pressure chamber being connected or connectable via a pressure line to at least one hydraulically actuatable wheel brake, and
an electrically controllable electromechanical drive device and a second mechanical connecting means for actuating the piston of the master cylinder, the electromechanical drive device arranged with the brake pedal on one side and with the brake master cylinder and the travel simulator on the other side, the first mechanical connecting means extending from the brake pedal to the travel simulator;
wherein the simulator and master cylinder are arranged substantially parallel and side-by-side, wherein the simulator is radially and laterally offset from the master cylinder.

2. The braking system as claimed in claim 1, further comprising in that the second mechanical connecting means is configured at least partially as a hollow body, and that the first mechanical connecting means is arranged at least partially inside the hollow body.

3. The braking system as claimed in claim 1, further comprising in that the travel simulator includes a simulator piston and a simulator cylinder, the simulator piston is connected to the first mechanical connecting means, the simulator piston and the simulator cylinder delimiting a hydraulic chamber.

4. The braking system as claimed in claim 3, further comprising in that the hydraulic chamber is connected or connectable to the at least one wheel brake.

5. The braking system as claimed in claim 3, further comprising in that the hydraulic chamber is connected via an electrically controllable valve to a low pressure accumulator.

6. The braking system as claimed in claim 3 further comprising in that the travel simulator includes, in addition to the simulator piston, a further piston and a spring, the simulator piston having a smaller effective piston area than the further piston, the simulator piston being guided displaceably in the further piston and bearing against the further piston by means of the spring.

7. The braking system as claimed in claim 3 further comprising in that an electrically controllable, normally open isolating valve is arranged between the hydraulic chamber of the travel simulator and the at least one wheel brake.

8. The braking system as claimed in claim 3 further comprising in that the simulator piston and the simulator cylinder of the travel simulator, and the brake master cylinder are arranged substantially parallel side-by-side, and at least the first or the second mechanical connecting means includes a force deflecting means.

9. The braking system as claimed in claim 1 further comprising in that the first and the second mechanical connecting means are configured in such a way that actuation of the brake master cylinder in a brake actuation direction is possible by means of the first mechanical connecting means acting through a mechanical contact between the first mechanical connecting means and a stop of the brake master cylinder, or between the first mechanical connecting means and a stop of the second mechanical connecting means.

10. The braking system as claimed in claim 1 further comprising at least one sensor device for enabling the determination of the relative position of the first mechanical connection means with respect to the second mechanical connecting means.

11. The braking system as claimed in claim 1 further comprising in that the pressure chamber of the brake master cylinder is connectable via an electrically controllable valve to a pressure medium container.

12. The braking system as claimed in claim 1 further comprising in that the second mechanical connecting means is configured in two parts, or the coupling between the master cylinder piston of the brake master cylinder and the second mechanical connecting means is configured releasably, wherein the master cylinder piston is actuatable by means of the first mechanical connecting means even if the drive device is blocked.

13. The braking system as claimed in claim 1 further comprising in that the first mechanical connecting means and the second mechanical connecting means are configured in such a way that the second mechanical connecting means can be displaced relative to the first mechanical connecting means by the drive device over a predetermined distance in a brake actuation direction without causing engagement with or reaction on the brake pedal.

14. The braking system as claimed in claim 1 wherein the first mechanical connecting means extends through the drive device to the travel simulator.

15. A braking system for motor vehicles, comprising
a brake pedal,
a travel simulator which is coupled via a first mechanical connecting means to the brake pedal for transmitting actuating forces,
a brake master cylinder having a pressure chamber and a master cylinder piston, the pressure chamber being connected or connectable via a pressure line to at least one hydraulically actuatable wheel brake, and
an electrically controllable electromechanical drive device and a second mechanical connecting means for actuating the piston of the master cylinder, the electromechanical drive device arranged with the brake pedal on one side and with the brake master cylinder and the travel simulator on the other side, the first mechanical connecting means extending from the brake pedal to the travel simulator;
wherein the travel simulator includes a simulator piston and a simulator cylinder, the simulator piston is connected to the first mechanical connecting means, the simulator piston and the simulator cylinder delimiting a hydraulic chamber; and
wherein the hydraulic chamber is connected via a nonreturn valve to the brake master cylinder which is connected to the at least one wheel brake.

* * * * *